Feb. 22, 1938.　　　　　L. D. GOFF　　　　　2,108,854
RETURN TRAP
Filed June 28, 1934　　　　2 Sheets-Sheet 1

Inventor
Leonard D. Goff
By Beaman & Langford
Attorney

Patented Feb. 22, 1938

2,108,854

UNITED STATES PATENT OFFICE 2,108,854

RETURN TRAP

Leonard D. Goff, Three Rivers, Mich.

Application June 28, 1934, Serial No. 732,822

29 Claims. (Cl. 137—103)

This invention relates to a trap mechanism and particularly to the operating mechanism therefor for controlling valves and associated structures.

While this invention is described in its association with a return trap and is particularly applicable to all traps, it is to be understood that the invention resides not in the specific trap construction but broadly in the toggle mechanism responsive to some stimulus for operating valves or equivalent mechanisms.

The trap, according to this invention, is provided with a steam pressure valve and a vent valve, a float, and toggle connections between the float and the valves for snap operation of the valves upon a predetermined change in level of the condensate within the trap. Toggles have been provided heretofore for operating valves associated with traps, for instance, as disclosed in the patent to Fulton, No. 662,489. However, this invention lies not in the broad idea but in the particular arrangement of the toggle with relation to the valve and the association of the toggle mechanism with the float.

Another object of this invention is to provide a return trap which does not require the use of a stuffing box, trunnions, exterior weights and levers and like parts which require frequent adjustment, maintenance and repair.

A further object of this invention is to provide leaf springs in association with the toggle mechanism for improving the quick action of the valves to prevent wire drawing and other associated ills arising from sluggish valve action.

Other objects lie in the parts and combinations thereof associated together in a structure for economical and efficient operation.

These and other objects will be apparent from the following specification when taken with the accompanying drawings in which.

Figure 1:
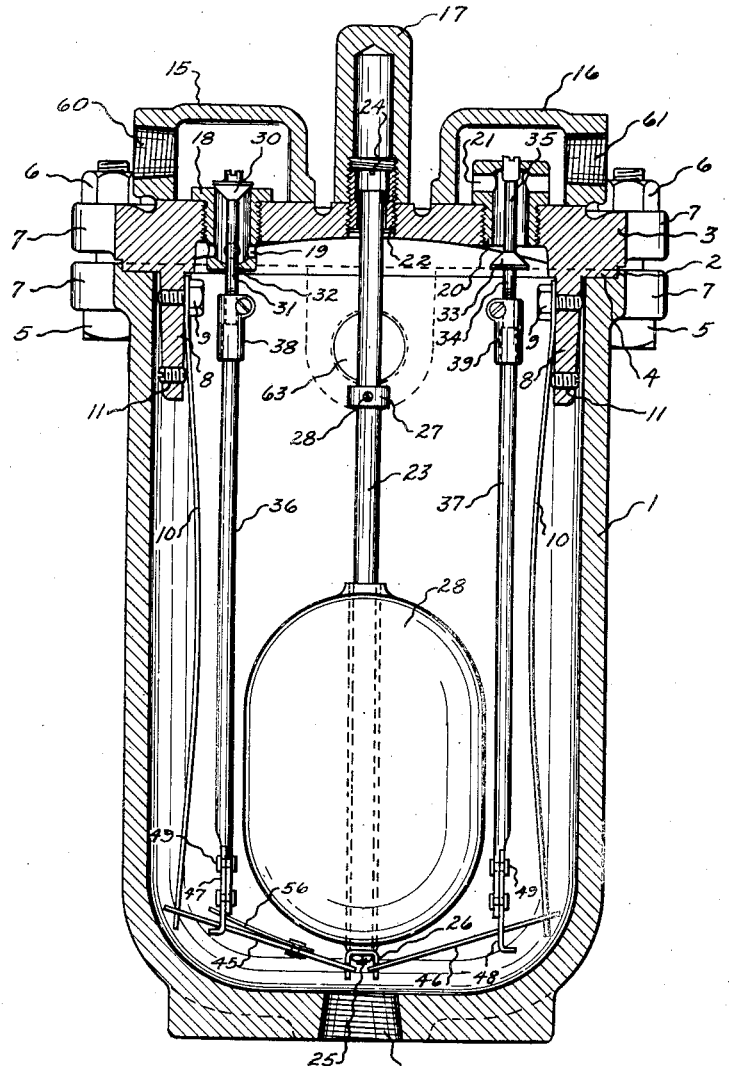
Fig. 1 is a vertical section of the trap according to this invention.

Figs. 3, 4, 5, and 6 are diagrammatic vertical sections showing the valves and toggle mechanisms in various positions for operation according to the level of the condensate within the trap.

Referring to the drawings, the reference character 1 designates a trap casing having an annular groove 2 machined in the top edge. A cover plate 3 has a complementary annular shoulder 4 for fitting within the groove 2. Bolts 5 and nuts 6 clamp the cover plate 3 and the casing 1 together by means of lugs 7. Depending from the cover plate 3 are two elongated lugs 8. Secured to the elongated lugs 8 by cap screws 9 are leaf springs 10 normally substantially flat but in operative position forced to assume a curved contour. Set screws 11 threaded into the lower portions of the elongated lugs 8 bear against the springs 10 at points removed from the cap screws 9 for varying the tension in the springs 10.

The cover plate 3 is provided with a pressure steam valve housing 15, a vent valve housing 16 and a float spindle housing 17, all suitably secured to the upper surface of the covering plate 3. Under the pressure steam valve housing 15 in the cover plate 3 is threaded a pressure steam valve seat 18. The seat 18 is provided with horizontal outlet ports 19. Under the vent valve housing 16 in the cover plate 3 is threaded a vent valve seat 20 provided with outlet ports 21. Under the float spindle housing 17 in the cover plate 3 is threaded a bushing 22 for receiving the vertically movable float spindle 23. In the upper end of the bushing 22 is a slot 24 for receiving a screw driver to assist in the positioning of the bushing 22 in the cover plate 3. As shown the housing 17 is secured in position by threaded engagement with the bushing 22.

Secured on one end of the spindle 23 by the nut 25 is a U-shaped metallic strip 26. Between the ends of the spindle 23 a stop collar 27 is secured by means of a set screw 28. Between the U-shaped strip 26 and the stop collar 27, slidably mounted on the spindle 23, is a float 28. The float rises or falls according to the level of the condensate within the trap casing 1. The stop 27 and the strip 26 provide a lost motion connection between the float 28 and the spindle 23.

A pressure steam valve 30 for seating on the seat 18 is provided with a depending stem 31 extending through the guiding opening 32 in the lower portion of the seat structure 18. A vent valve 33 for seating on the seat 20 is provided with a depending stem 34 and a guiding stem 35, the guiding stem engaging with the guiding opening in the seat structure 20. Adjustably secured to the valve stems 31 and 34 are depending rods 36 and 37, respectively, for connecting the valves with the toggle mechanism. Clamps 38 and 39, respectively, are provided for adjustably receiving the threaded ends of the stems 31 and 34 whereby the valves 30 and 33 may be adjusted.

The toggle mechanism comprises the springs 10, toggle levers 45 and 46, the valve spindle 23 and the U-shaped metallic strip 26. The rods 36 and 37 are provided with L-shaped extensions 47 and 48 engaging with the toggle levers 45 and 46 for operating the valves 30 and 33, respectively. The extensions 47 and 48 are preferably secured with rivets 49 to the rods 36 and 37, respectively.

Figure 2:
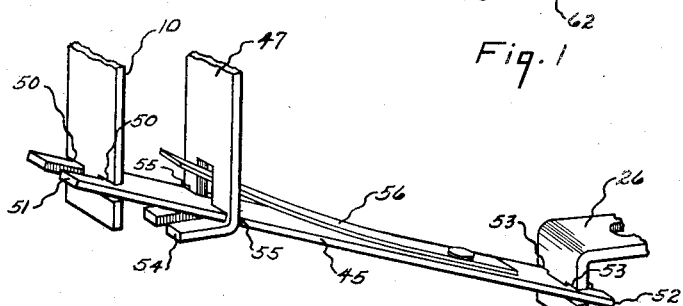
Fig. 2 is a detailed perspective view of the toggle mechanism.

Referring particularly to Fig. 2 wherein the toggle mechanism is illustrated in detail the specific connections between the various elements are shown. The leaf spring 10 is provided with oppositely disposed notches 50 for receiving the bifurcated end 51 of the toggle lever 45. The opposite end 52 in the toggle lever 45 is also bifurcated for being received by the oppositely disposed notches 53 of the U-shaped metallic strip 26. The L-shaped extension 47 is bifurcated at its lower end 54 and is received by oppositely disposed notches 55 in the toggle lever near the outer end thereof to provide a lost motion connection. An auxiliary valve actuating leaf spring 56 is riveted or otherwise suitably secured to the toggle lever 45. The spring 57 is of slightly less width than the slot between the bifurcated end 54 of the extension 47 and is received thereby. It is to be understood that the arrangement and construction of the parts associated with the toggle lever 46 are the same as that of those associated with the toggle lever 45 except that the auxiliary valve actuating leaf spring 56 is dispensed with.

The pressure steam valve housing 15 is provided with an inlet 60 for receiving any suitable conduit conducting pressure steam from the boiler. The vent valve housing 16 is provided with an outlet 61 leading to a venting outlet. The trap casing 1 is provided at its bottom with an opening 62 for receiving the conduit connected with the boiler and having a check valve therein not shown, all as is well known in the art. An opening 63 is provided for receiving condensate from a receiving tank or directly from individual traps draining steam heated equipment, also as is well known in the art.

The operation is as follows: In normal position with the trap empty the pressure steam inlet valve 30 is closed being maintained so by the boiler pressure, the vent valve 33 is open and the float 28 is at its lowermost position, resting against the U-shaped metallic strip 26.

As the check valve in the conduit leading from the outlet 62 to the boiler is normally maintained closed by the boiler pressure, condensate received through the opening 63 accumulates in the trap casing 1 causing the float 28 to rise. When the float 28 rises to sufficient height to strike the stop collar 27 on the spindle 23 it carries the spindle 23 upwardly. As the spindle 23 moves upwardly it carries with it the inner ends of the toggle levers 45 and 46. As the spindle is lifted and carries with it the toggle levers 45 and 46, the springs 10 are moved outwardly slightly until the inner ends of the toggle levers 45 and 46 have been carried upwardly to just past horizontal position as shown particularly in Fig. 4. In this position the auxiliary valve actuating spring 56 has assumed a flattened outline and is under compression. Slight further upward movement of the spindle 23 results in the pressure exerted by the springs 10 rapidly snapping the toggle levers 45 and 46 into their upward bowed position. This movement partially opens the valve 30 and closes the valve 33. At the same time the compression in the spring 56 is released to move the valve 30 to its full open position. The closing of the vent valve 33 limits the upward movement of the toggle. The trap in this position is shown diagrammatically in Fig. 5. The quick opening of the pressure steam valve 30 acts to eliminate wire drawings.

The trap is now open to boiler pressure and filled with water. The steam under pressure from the boiler enters through the opening 60, past the valve 30 into the casing 1. The pressure in the trap is thus made equal to that in the boiler and as the trap is disposed above the level of the water in the boiler, the condensate in the trap is discharged by draining into the boiler. The horizontally disposed ports 19 in the valve 30 are provided to prevent steam from rushing directly into the condensate and being rapidly condensed. A check valve, not shown, located in the conduit leading from the inlet 63 to the source of supply of the condensate prevents the steam under pressure from escaping through the inlet 63.

Figure 3:
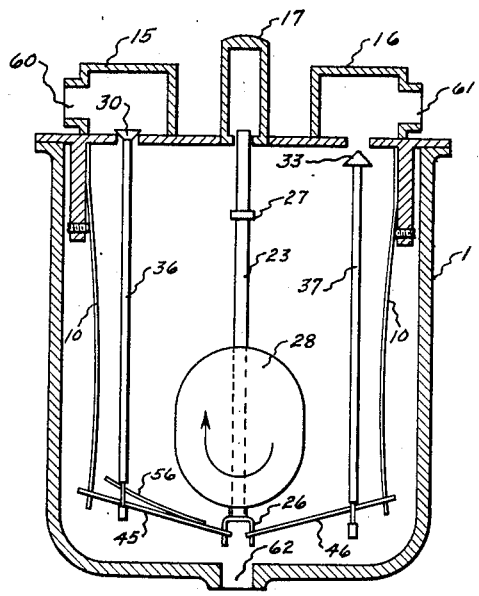
Figure 4:
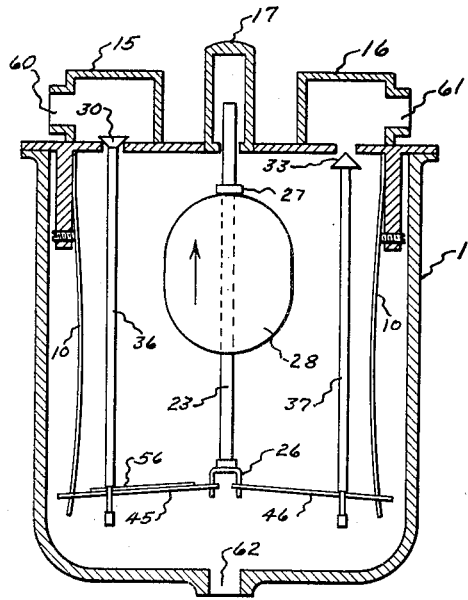
Figure 5:
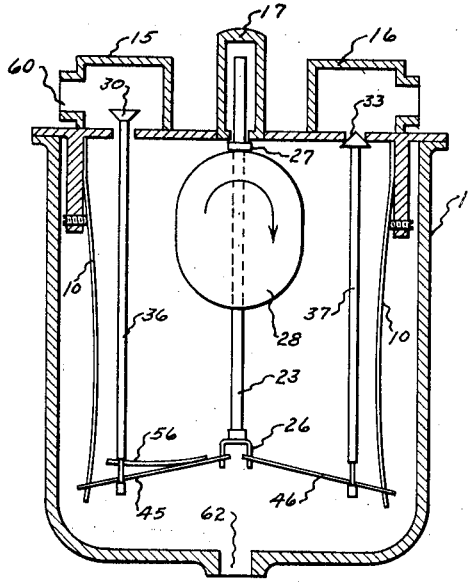
Figure 6:
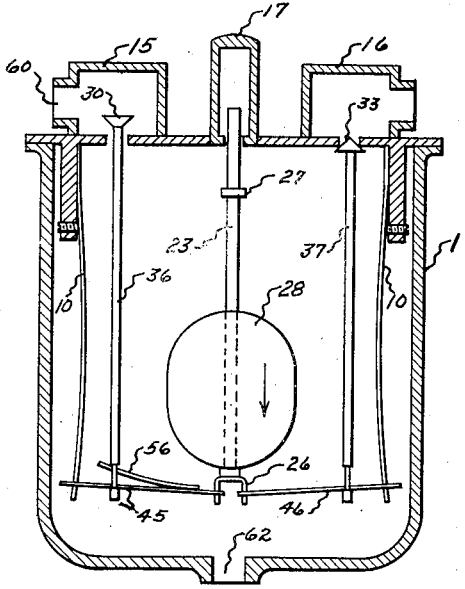

When the condensate has drained from the casing 1 to such an extent that the float 28 drops and engages with the U-shaped metallic strip 26, it carries downwardly the toggle levers 45 and 46 until their position is substantially horizontal as shown in Fig. 6. A slightly further downward movement results in the pressure exerted by the springs 10 snapping the toggle to its lower bowed position, closing the pressure valve 30 and opening the vent valve 33. The toggle movement partially opens the vent valve 33, the opening being completed by the action of gravity. The closing of the pressure steam valve 30 limits the downward movement of the toggle. The mechanism of the trap then presents the position as shown in Fig. 3 and is ready to complete the cycle of operation.

It will be apparent from the foregoing description that the toggle levers 45 and 46 and their associated parts are pivoted to each other by knife edge connections. This type of connection has been found to be highly satisfactory and is not only extremely simple to manufacture but it is not subject to destructive wear or sticking with the result that maintenance costs are reduced to a minimum. It will be further noticed that due to the valve stem extensions being connected to the toggle levers near their outer ends, the resulting leverage exerts, in opening and closing the valves, a greater force than that exerted by the float and the springs alone.

While a specific embodiment of the invention has been described it will be apparent that various changes may be made. For instance, the float 28 may be fixed to the spindle 23 instead of slidably mounted thereon. Further, condensate may be admitted to the trap through the opening 62 rather than an opening in the side of the trap as shown. In the event condensate is admitted through the opening 62 it will be, of course, obvious that this may be accomplished by the proper use of check valves in the discharge to the boiler pipe and the condensate pipe.

From the foregoing it will be evident that I have provided a trap which has as advantages over other types of traps for similar service, simplicity of construction, the elimination of wearing parts that would effect the operation and reliability of service over long periods of time.

Having thus described my invention what I desire to secure by Letters Patent and claim is:

1. A return trap and the like comprising a casing, a float therein, a toggle primarily operable by said float, resilient means accelerating the operation of said toggle, condensate discharging means operated by said toggle, said means including a pressure steam valve, and means associated with said toggle for accelerating the operation of said valve.

2. A return trap and the like comprising a casing, a float therein, a toggle primarily operable by said float, condensate discharging means operated by said toggle, said means including a pressure steam valve, means operably connecting said toggle to said valve and means associated with said toggle bearing against said connecting means for accelerating the operation of said valve.

3. A return trap and the like comprising a casing, a float therein, a toggle primarily operable by said float, said toggle comprising two outwardly extending toggle levers, means connecting said float and the inner ends of said toggle levers, resilient means for engaging the outer ends of said toggle levers for accelerating the operation of said toggle, condensate discharging means operated by said toggle, and means connected to one of said toggle levers for accelerating the operation of said condensate discharging means.

4. A return trap and the like comprising a casing, a float therein, a toggle primarily operable by said float, said toggle comprising two outwardly extending toggle levers, means connecting the float and the inner ends of said toggle levers, leaf springs engaging the outer ends of said toggle levers for accelerating the operation of said toggle, condensate discharging means operated by said toggle, and resilient means connected to one of said toggle levers for accelerating the operation of said condensate discharging means.

5. A return trap and the like comprising a casing, a float therein, a toggle primarily operable by said float, said toggle comprising two outwardly extending toggle levers, means connecting the float and the inner ends of said toggle levers, resilient means engaging the outer ends of said toggle levers for accelerating the operation of said toggle, condensate discharging means operated by said toggle, said condensate discharging means including a pressure steam valve and resilient means associated with one of said toggle levers for accelerating the operation of said valve.

6. A return trap and the like comprising a casing, a float therein, a toggle primarily operable by said float, said toggle comprising two outwardly extending toggle levers, means connecting the float and the inner ends of said toggle levers, resilient means engaging the outer ends of said toggle levers for accelerating the operation of said toggle, condensate discharging means operated by said toggle, said means including a pressure steam valve, means providing a lost motion connection between one of said toggle levers and said valve, and resilient means associated with said last named toggle lever and said connecting means for accelerating the operation of said valve.

7. A return trap and the like comprising a casing, a float therein, a toggle primarily operable by said float, a vertically movable spindle, upper and lower stops thereon for engagement by said float for moving said spindle, said toggle including outwardly extending toggle levers pivotally connected to said spindle at their inner ends, resilient means engaging the outer ends of said toggle levers for accelerating the operation of said toggle, and condensate discharging means operated by said toggle.

8. A return trap and the like comprising a casing, a float therein, a spring stressed toggle, means for operating said toggle, a lost motion connection between said means and said float for actuation of said means by said float, and condensate discharging means operated by said toggle, said structure being characterized by the fact that said condensate discharging means is positively actuated by said float.

9. A return trap and the like comprising a casing, a float therein, a toggle, means for positively operating said toggle, a lost motion connection between said means and said float for actuation of said means by said float, condensate discharging means operated by said toggle, said condensate discharging means including a pressure steam valve and resilient means associated with said toggle for accelerating the operation of said valve, said structure being characterized by the fact that said condensate discharging means is positively actuated by said float.

10. A return trap and the like comprising a casing, a float therein, a toggle, means connected to said toggle for positively operating the same, a lost motion connection between the said float and said operating means, resilient means for accelerating the operation of said toggle, and condensate discharging means operated by said toggle, said structure being characterized by the fact that said condensate discharging means is positively actuated by said float.

11. A return trap and the like comprising a casing, a float therein, a toggle, a vertically extending spindle, a lost motion connection between said float and said spindle, said toggle including two opposed outwardly extending toggle levers connected at their inner ends to said spindle, and depending leaf springs supporting the outer ends of said toggle levers and operable to accelerate the operation of said toggle.

12. A return trap and the like comprising a casing, a float therein, a pressure steam inlet valve, a vent valve, a condensate inlet, a discharge opening, a toggle primarily operable by said float and connections between said pressure steam valve and said vent valve, and said toggle, said valves and connections being characterized by the fact that when one valve is open the other valve is closed, whereby upon the condensate in said casing reaching a predetermined level, said float operates said toggle to open the pressure steam valve and to close the vent valve to discharge the condensate from said casing.

13. A return trap and the like comprising a casing, a float therein, a pressure steam inlet valve, a vent valve, a condensate inlet, a discharge opening, a toggle having connections for positive operation by said float, said toggle including two outwardly extending toggle levers, means connecting said float and said toggle levers at the inner ends of said levers and means connecting one of said valves to one of said levers between the ends thereof and the other of said valves to the other of said levers between the ends thereof, said valves and connections being characterized by the fact that when one valve is open the other valve is closed, whereby upon the condensate in said casing reaching a predetermined level said float operates said toggle to open the pressure steam valve and to close the vent valve to discharge the condensate from said casing.

14. A return trap and the like comprising a casing, a float therein, a toggle, vertically extending spindle, a lost motion connection between said float and said spindle for vertically moving said spindle, said toggle including two opposed outwardly extending toggle levers connected at their inner ends to said spindle, condensate discharging means, said condensate discharging means including a pressure steam inlet valve and a vent valve, and means providing a lost motion connection between one of said valves and one of said levers and the other of said valves and the other of said levers whereby operation of said toggle by said spindle operates said valves.

15. A return trap and the like comprising a casing, a float therein, a toggle, a vertically extending spindle, a lost motion connection between said float and said spindle, said toggle including two opposed outwardly extending toggle levers connected at their inner ends to said spindle, condensate discharging means including a pressure steam valve and a vent valve, means to provide a lost motion connection between one of said valves and one of said levers and the other of said valves and the other of said levers and resilient means engaging the outer ends of said toggle levers operable to accelerate the operation of said toggle.

16. A return trap and the like comprising a casing, a float therein, a toggle, a vertically extending spindle, a lost motion connection between said float and said spindle, said toggle including two opposed outwardly extending toggle levers connected at their inner ends to said spindle, condensate discharging means including a pressure steam inlet valve and a vent valve, means providing a lost motion connection between one of said valves and one of said levers and the other of said valves and the other of said levers, resilient means engaging the outer ends of said toggle levers and operating to accelerate the operating of said toggle and means associated with the toggle lever connected to said pressure steam inlet valve for accelerating the operation of said inlet valve.

17. A return trap and the like comprising a casing, a float therein, a toggle, a vertically extending spindle, a lost motion connection between said float and said spindle, said toggle including two opposed outwardly extending toggle levers connected at their inner ends to said spindle, condensate discharging means including a pressure steam inlet valve and a vent valve, depending leaf springs supporting the outer ends of said toggle levers and operating to accelerate the operation of said toggle, means providing lost motion connection between one of said valves and one of said levers and the other of said valves and the other of said levers, and resilient means associated with the toggle lever connected to said pressure steam inlet valve accelerating the opening of said pressure steam inlet valve.

18. A return trap and the like comprising a casing, a float therein, a toggle primarily operable by said float, said toggle comprising two outwardly extending toggle levers, means connecting said float and the inner ends of said toggle levers, means engaging the outer ends of said toggle levers for accelerating the operation of said toggle, the connection between said float connecting means and said toggle levers, and said accelerating means and said toggle levers being of the knife edge type, and condensate discharging means operated by said toggle.

19. A return trap and the like comprising a casing, a float therein, a toggle primarily operable by said float, said toggle comprising two outwardly extending toggle levers, means connecting the float and the inner ends of said toggle levers, in normal position being supported by said toggle levers, resilient means engaging the outer ends of said toggle levers for accelerating the operation of said toggle and supporting the outer ends of said toggle levers, condensate discharging means operated by said toggle, and means for limiting the lowermost position of said toggle, said means including a pressure steam valve comprising a portion of the condensate discharging means.

20. A return trap and the like comprising a casing, a float therein, a toggle primarily operable by said float, said toggle comprising two outwardly extending toggle levers, means connecting said float and the inner ends of said toggle levers, in normal position being supported by said toggle levers, resilient means for engaging the outer ends of said toggle levers for accelerating the operation of said toggle and supporting the outer ends of said toggle levers, condensate discharging means operated by said toggle, and means for limiting the upward movement of said toggle, said means comprising a vent valve comprising a portion of the condensate discharging means.

21. In a return trap and the like, the combination with a float, inlet and outlet valve mechanisms, means positively actuated by said float for actuating said valve mechanisms, said means being resiliently urged into two different positions under the control of said float, said inlet valve mechanism being urged to a seat with said means in one position and said outlet valve mechanism being urged to a seat with said means in the other position, said structure being characterized by the fact that said valve mechanisms are positively actuated by said float.

22. In a return trap and the like, the combination with a float, valve mechanisms, means positively actuated by said float for actuating said valve mechanisms, said means being resiliently urged into two different positions under the control of said float with snap action, said means being directly connected to said valve mechanisms, said structure being characterized by the fact that said valve mechanisms are positively actuated by said float.

23. In a return trap and the like, the combination of a float, valve mechanism, a toggle joint positively actuated by said float for actuating said valve mechanism, said toggle joint being resiliently urged into two different positions under the control of said float with snap action, said toggle joint being directly connected to said valve mechanism, said structure being characterized by the fact that said valve mechanism is positively actuated by said float.

24. In a return trap and the like, the combination of a casing, of a superstructure constituting a cover for said casing and having valve and valve actuating mechanisms depending therefrom into said casing, said mechanism comprising a float guided for vertical movement centrally of said casing, resilient members depending from said superstructure along opposite sides of said casing, a toggle joint supported between said members, means operatively connecting said float with the knee of said toggle joint whereby the same is actuated by said float, said depending valve mechanism being operatively connected to said toggle and actuated by the movement thereof.

25. In a return trap and the like, the combination of a casing, a float therein, a toggle joint primarily operable by said float, means connecting the float and the knee of said joint, leaf springs supported in said casing supporting opposite ends of said joint for accelerating the operation of said toggle, valve mechanism operated by said toggle, the movement of said toggle joint being imparted to said mechanism at a point between the knee and a supported end thereof.

26. A return trap and the like, comprising a casing, a float therein, a toggle primarily operable by said float, resilient means accelerating the operation of said toggle, condensate discharging means operated by said toggle, said means including a pressure steam valve, and a leaf spring associated with said toggle for accelerating the operation of said valve, said structure being characterized by the fact that said condensate discharging means is positively actuated by said float.

27. A return trap and the like, comprising a casing, operating means therein, a toggle primarily operable by said operating means, resilient means accelerating the operation of said toggle, condensate discharging means operated by said toggle, said means including a pressure steam valve, and means associated with said toggle for accelerating the operation of said valve, said structure being characterized by the fact that said condensate discharging means is positively actuated by said operating means.

28. A return trap and the like, comprising a casing, operating means therein, a toggle primarily operable by said operating means, condensate discharging means operated by said toggle, said means including a pressure steam valve, means operably connecting said toggle to said valve, and means associated with said toggle bearing against said connecting means for accelerating the operating of said valve.

29. A return trap and the like, comprising a casing, operating means therein, a toggle primarily operable by said operating means, leaf springs accelerating the operation of said toggle, condensate discharging means operated by said toggle, said means including a pressure steam valve, and resilient means carried by said toggle for accelerating the operation of said valve, said structure being characterized by the fact that said condensate discharging means is positively actuated by said operating means.

LEONARD D. GOFF.

CERTIFICATE OF CORRECTION.

Patent No. 2,108,854.  February 22, 1938.

LEONARD D. GOFF.

It is hereby certified that error appears in the printed specification of the above numbered patent requiring correction as follows: Page 5, second column, lines 19, 20, 21 and 22, claim 29, strike out the comma and words ", said structure being characterized by the fact that said condensate discharging means is positively actuated by said operating means" and insert the same after "valve" and before the period in line 11, claim 28; and that the said Letters Patent should be read with this correction therein that the same may conform to the record of the case in the Patent Office.

Signed and sealed this 12th day of April, A. D. 1938.

(Seal)

Henry Van Arsdale,
Acting Commissioner of Patents.